United States Patent [19]
Chambers, Jr.

[11] 3,854,012
[45] Dec. 10, 1974

[54] SWITCHING CIRCUIT FOR PREVENTING LOST CALLS

[75] Inventor: Charles W. Chambers, Jr., Amherst, Ohio

[73] Assignee: Lorain Products Corporation, Lorain, Ohio

[22] Filed: Apr. 23, 1973

[21] Appl. No.: 353,236

[52] U.S. Cl. ........................ 179/18 AD, 179/18 AH
[51] Int. Cl. ............................................ H04m 3/42
[58] Field of Search ...................... 179/18 AD, 18 B

[56] References Cited

UNITED STATES PATENTS 3,714,380 1/1973 Berryman et al. ............ 179/18 AH

*Primary Examiner*—William C. Cooper
*Attorney, Agent, or Firm*—Edward C. Jason

[57] ABSTRACT

A circuit for preventing the disconnection of PBX calls from a PBX in the presence of open circuits at ESS central offices. A switching network is adapted to assume a first operative state to establish a direct metallic connection between a central office and a PBX during the transmission therebetween of normal switching, signalling and talking currents such as dialing and ringing. The switching network is also adapted to assume a second operative state to apply battery potential and ground to the PBX to simulate a closed circuit condition to a PBX call in the presence of open circuits at the central office. Novel sensing circuitry is provided to distinguish between the central office and PBX conditions under which operation of the switching network in the first state is desirable and the central office and PBX conditions under which operation of the switching network in the second state is desirable, thus assuring that under certain conditions lost calls are prevented without interfering with normal telephone system operations.

10 Claims, 1 Drawing Figure

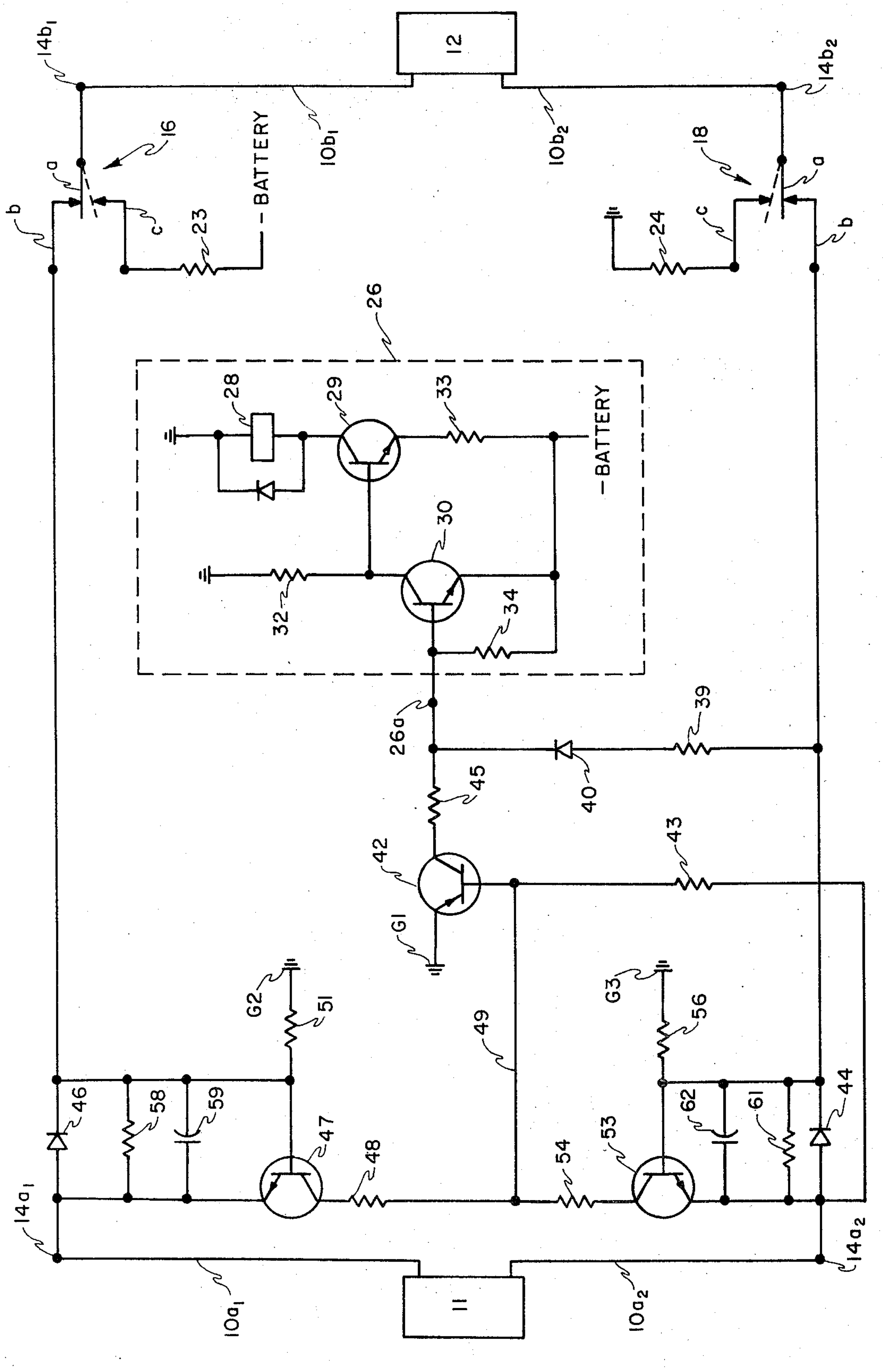
- BATTERY
- BATTERY

SWITCHING CIRCUIT FOR PREVENTING LOST CALLS

BACKGROUND OF THE INVENTION

The present invention relates to telephone system switching circuits and is directed more particularly to switching circuitry for preventing the unintended termination of calls connected through a PBX under conditions such as, for example, the transfer of the connections of a non-PBX telephone set from a PBX telephone set to any other telephone set.

In order to improve the flexibility of telephone service, central offices known as ESS central offices have been and are being constructed. Among the services afforded by these central offices is the ability of a first party who is using his telephone set to talk to a second party to receive an indication that a third party is trying to reach him and thereafter put the second party on hold and transfer his connection to the third party. This transfer to a third party is usually accomplished as the first party depresses and releases his hookswitch. The first party may then transfer back to the second party by depressing and releasing his hookswitch a second time. This service is known as the "call waiting" feature. Other special customer service features include the ability of a subscriber to add an extra party to an existing two-party conversation to establish a conference call.

Prior to the present invention, it has been difficult for ESS central offices to provide these and other special customer features in connection with telephone sets serviced by certain PBX's or private branch exchanges. In particular, PBX's with certain features such as outgoing dial transfer have been found to terminate calls made therethrough where such calls are involved in the provision of special customer service features by an ESS central office. When, for example, a first party not serviced by a PBX is talking to a second party that is serviced by a PBX and attempts to become connected to a third party not serviced by the PBX, it often happens that, upon transfer, the PBX terminates rather than holds the connection to the second party. As a result, the first party cannot become reconnected to the second party in the intended manner. Similar premature termination of calls occurs during the provision of other special customer service features in connection with calls completed through a PBX.

One difficulty in preventing premature termination of PBX calls is that the circuitry which is inserted to prevent the loss of calls must not interfere with the normal switching, signalling and talking operations of the line. In particular, the added circuitry must not interfere with established exchange operation, for instance, the transmission of ringing current from the central office, the transmission of dial pulses from the PBX, seizure by either the central office or the PBX, tripping the ring upon pick up by the called party, supervisory polarity reversals which occur without the opening of the line at the central office, or the transmission of voice signals.

In accordance with the present invention there is provided novel circuitry which maintains the desired connection between a telephoneeset and a PBX in the presence of special customer service features but which does not interfere with normal telephone system activities such as ringing, seizure, dialing and talking.

SUMMARY OF THE INVENTION

It is an object of the invention to provide circuitry for preventing the unintended disconnection of a telephone set from a PBX.

Another object of the invention is to provide circuitry for maintaining the operative association of a telephone set and a PBX during the provision of special customer service features in connection with parties not serviced by that PBX.

Yet another object of the invention is to provide circuitry which prevents the loss of PBX calls by making it appear to the PBX that the conditions necessary for the continuation of the call exist under circumstances where such conditions do not in fact exist.

Still another object of the invention is to provide circuitry of the above character which does not interfere with normal telephone system operating conditions such as ringing, dialing, seizure and talking.

It is another object of the invention to provide circuitry which is adapted to simulate normal line conditions under circumstances where the central office attempts to apply an open circuit to that line through the PBX.

DESCRIPTION OF THE DRAWINGS

The single FIGURE is a schematic diagram of one exemplary circuit embodying the invention.

DESCRIPTION OF THE INVENTION

Referring to FIG. 1 there are shown the conductor pairs 10$a_1$–10$a_2$ and 10$b_1$–10$b_2$ of a two-wire trunk which serves to connect an ESS central office 11 to a PBX 12. The circuit of the invention is connected between conductor pairs 10$a_1$–10$a_2$ and 10$b_1$–10$b_2$ by terminal pairs 14$a_1$–14$a_2$ and 14$b_1$–14$b_2$. As a result of this connection, signaling, switching and talking currents can be transmitted between central office 11 and PBX 12 only through the circuit of the invention.

Ordinarily, the circuit of the invention connects conductor pair 10$a_1$–10$a_2$ to conductor pair 10$b_1$–10$b_2$ through two-state switching means which here take the form of two single-pole double-throw relay contact sets 16 and 18 each of which has a movable contact *a* and first and second fixed contacts *b* and *c*. When contact sets 16 and 18 are in the full line positions shown in the drawing, a direct metallic connection is provided between central office 11 and PBX 12. When, on the other hand, contact sets 16 and 18 are in the dotted line positions shown in the drawing, central office 11 is open-circuited and thereby isolated from PBX 12. At the same time, resistors 23 and 24 apply negative battery voltage and ground potential to conductors 10$b_1$ and 10$b_2$ to make it appear to the PBX that it is still connected to the central office battery and ground within central office 11. Thus, the switching means comprising contact sets 16 and 18 has a first operative state in which central office 11 is directly connected to PBX 12 and has a second operative state in which a virtual or substitute battery and a virtual or substitute ground are connected to PBX 12, through resistors 23 and 24, to mask the open circuit then appearing at central office 11.

Switching means 16 and 18 is adapted to assume its first operative state to accommodate the transmission of telephone system voltages and currents such as ringing currents, dialing currents and voice currents between central office 11 and PBX 12. This operative state assures unimpeded telephone system operation under all ordinary operating conditions. In accordance with the present invention, however, switching means 16 and 18 is adapted to assume its second operative state when central office 11 applies an open circuit to trunk $10a_1$–$10a_2$ and thereby open-circuits any telephone set which is connected to trunk $10a_1$–$10a_2$ through PBX 12, for example, during the provision of special customer service features. This operative state prevents what would otherwise be the premature termination of the call within the PBX by applying to PBX 12 voltage and current conditions which assure the continuity of the call. Thus, the circuit of the invention prevents the loss of PBX calls without interfering with the desired normal operation of the central office and PBX.

THE CONTROL NETWORK

To the end that the operative state of switching means 16 and 18 may be controlled in accordance with the voltages at and currents through the central office and PBX, there is provided switching control means 26. In the present embodiment, control means 26 includes a relay coil 28 for opening and closing contact sets 16 and 18, an NPN transistor 29 for controlling the flow of energizing current through relay coil 28, and an NPN transistor 30 for holding transistor 29 in a non-conducting state under all conditions except those in which the establishment of the second operative state of switching means 16 and 18 is desirable. Control means 26 also includes suitable resistors 32 and 33 for connecting the base and emitter leads of transistor 29 between ground and negative battery and a resistor 34 for connecting the base-emitter leads of transistor 30.

When the input 26*a* of control network 26 is sufficiently positive from negative battery to cause a predetermined minimum control current to flow into network 26, transistor 30 conducts a collector-emitter current through resistor 32 which lowers the potential of the base of transistor 29 and thereby maintains transistor 29 non-conducting. Under these conditions, relay coil 28 is de-energized and contact sets 16 and 18 are in their first or full line positions to establish the first operative state of the circuit of the invention. When, however, control network input 26*a* is not sufficiently positive from negative battery to establish the required minimum control current, transistor 30 turns off and thereby allows the potential of the base of transistor 29 to rise to a value at which transistor 29 becomes conducting. The conduction of transistor 29, in turn, energizes relay coil 28 and thereby causes contact sets 16 and 18 to assume their second or dotted line positions to establish the second operative state of the circuit of the invention. Thus, switching means 16 and 18 assumes its first operative state when the control voltage or control current at input 26*a* is greater than a predetermined minimum voltage or current value and assumes its second operative state when the control voltage and control current at input 26*a* are less than those predetermined values.

In accordance with the invention, the control voltage and current at control network input 26*a* are maintained at values greater than their predetermined minimum values under all telephone system conditions wherein it is desirable to maintain a direct metallic connection between central office 11 and PBX 12 and drop below those predetermined values under all telephone system conditions wherein it is desirable to mask an open circuit at the central office by applying a virtual battery and ground to PBX 12. In the present embodiment, this is accomplished by connecting control network input 26*a* to a plurality of sensing networks and by arranging the sensing networks so that the flow of current in any one or more of the sensing networks will cause control means 26 to establish or maintain the first operative state of switching means 16 and 18 and so that the absence of current in all sensing networks will cause control means 26 to establish or maintain the second operative state of switching means 16 and 18. Thus, the sensing circuitry operates in the manner of an "OR" circuit to establish or maintain operation of switching means 16 and 18 in its first operative state and operates in the manner of an "NAND" circuit to establish or maintain the operation of switching means 16 and 18 in its second operative state.

THE SENSING NETWORKS

A first sensing network for establishing control voltage and current at control network input 26*a* includes the path from central office 11 through conductor $10a_2$, a diode 44, a resistor 39 and a diode 40. Current will flow through this path to establish or maintain the first operative state of switching means 16 and 18 under any condition in which central office 11 causes terminal $14a_2$ to be at or near ground potential.

A second sensing network for establishing control voltage and current at control network input 26*a* includes the path from ground G1 through the base-emitter circuit of a PNP transistor 42, a resistor 43, diode 44, contact set 18, and conductor $10b_2$ to PBX 12. Current flow through this path maintains the first operative state of switching means 16 and 18 by establishing control current flow in the path from ground G1, through the emitter-collector circuit of transistor 42, and a resistor 45, to control network input 26*a*. Current flow through the second sensing network will maintain the first operative state of switching means 16 and 18 under any condition in which contact set 18 is in its normally closed state and PBX 12 applies a negative voltage to terminal $14b_2$.

A third sensing network for establishing control voltage and current at control network input 26*a* includes the path from PBX 12, through conductor $10b_1$, contact set 16, the base-emitter path of an NPN transistor 47 and conductor $10a_1$ to central office 11. Current flow in this path maintains the first operative state of switching means 16 and 18 by maintaining current flow through the path including ground G1, the base-emitter circuit of transistor 42, a conductor 49, a resistor 48, the collector-emitter circuit of transistor 47 and conductor $10a_1$ to central office 11. The latter current, in turn, maintains control current flow through the path from ground G1, the emitter-collector circuit of transistor 42 and resistor 45 to control network input 26*a*. Current flow through the third sensing network will maintain the first operative state of switching means 16 and 18 under any condition in which contact set 16 is in its normally closed state and current flows toward central office 11 through conductors $10b_1$ and $10a_1$.

A fourth sensing network for establishing or maintaining control voltage and current at control network input 26*a* includes the path from ground G2, through a resistor 51, the base-emitter circuit of transistor 47 and conductor $10a_1$ to central office 11. Current flow through this path establishes or maintains the first operative state of switching means 16 and 18 by establishing or maintaining conduction through the path including ground G1, the base-emitter circuit of transistor 42, conductor 49, resistor 48, the collector-emitter circuit of transistor 47 and conductor $10a_1$ to central office 11. The latter current, in turn, causes transistor 42 to conduct control current from ground G1, through the collector-emitter circuit of transistor 42 and resistor 45 to control network input 26*a*. Current flow through the fourth sensing network will establish or maintain the first operative state of switching means 16 and 18 under any condition in which central offices 11 causes conductor $10a_1$ to be negative from ground G2.

A fifth sensing network for maintaining control voltage and current at control network input 26*a* includes the path from PBX 12 through conductor $10b_2$, contact set 18, the base-emitter path of an NPN transistor 53 and conductor $10a_2$ to central office 11. Current through this path maintains the first operative state of switching means 16 and 18 by establishing conduction through the path including ground G1, the base-emitter circuit of transistor 42, conductor 49, a resistor 54, the collector-emitter circuit of transistor 53 and conductor $10a_2$ to central office 11. The latter current, in turn, establishes collector-emitter conduction through transistor 42 to apply control current to control network input 26*a*. The fifth sensing network maintains the first operative state of switching means 16 and 18 under any condition in which contact set 18 is in its normally closed state and current flows toward central office 11 through conductors $10b_2$ and $10a_2$.

The sixth sensing network for establishing or maintaining control voltage and current at control network input 26*a* includes the path from ground G3, through a resistor 56, the base-emitter path of transistor 53 and conductor $10a_2$ to central office 11. Current through this path establishes or maintains the first operative state of switching means 16 and 18 by establishing a current flow through the path including ground G1, the base-emitter path of transistor 42, conductor 49, resistor 54, the collector-emitter path of transistor 53 and conductor $10a_2$ to central office 11. The latter current, in turn, establishes collector-emitter conduction through transistor 42 to apply control current to control network input 26*a*. The sixth sensing network establishes or maintains the first operative state of switching means 16 and 18 under any condition in which central office 11 renders conductor $10a_2$ negative from ground G3.

It will be understood that while any one of the above described networks can, by itself, control conduction through switching means 16 and 18, two or more of these sensing networks may be effective to establish or maintain the first operative state of switching means 16 and 18 under a given central office and PBX operating condition. The advantage of this "OR" relationship between the sensing networks and network 26 is that it allows the central office and PBX operating voltages and currents to change during the course of conditions such as ringing or dialing without causing switching means 16 and 18 to assume its second operative state. At the same time, this "OR" relationship assures that the second operative state of switching means 16 and 18 can occur only under a set of central office and PBX operating conditions wherein none of the above sensing networks energize network 26. Thus, the second operative state of switching means 16 and 18 can be made to occur only under those conditions wherein the central office open circuits conductors $10a_1$ and $10a_2$ while a PBX telephone set is connected across conductors $10b_1$ and $10b_2$ as, for example, during the utilization of special customer service features.

EXCHANGE OPERATION

The manner in which the above described six sensing networks maintain a direct connection between the central office and the PBX during ordinary telephone system operating conditions and establish virtual battery and ground connections to the PBX when there exists a danger of lost calls will now be described. The first operating condition to be discussed will be the sequence of telephone system operating conditions which make up the process known as seizure, that is, the process whereby either the central office or the PBX establishes an operative connection with the other through line conductor pairs $10a_1$–$10a_2$ and $10b_1$–$10b_2$.

A. SEIZURE

Prior to seizure by the central office, that is, when the trunk is idle, the central office and PBX cause terminals $14a_1$ and $14b_2$ to be at the potential of negative battery and cause terminals $14a_2$ and $14b_1$ to be open-circuited. Under these conditions, switching means 16 and 18 is maintained in its first operative state by current flow through the second and fourth sensing networks. After seizure begins, there occurs an operating condition in which terminals $14a_1$, $14a_2$ and $14b_1$ are open and in which terminal $14b_2$ is at the potential of negative battery. Under these conditions, switching means 16 and 18 is maintained in its first operative state by current through the second sensing network. Still later in the seizure process, terminal $14a_1$ and $14b_2$ are at the potential of negative battery, terminal $14a_2$ is at ground potential and terminal $14b_1$ is open. Under these conditions, the first operative state of switching means 16 and 18 is maintained by current flow through the second and fourth sensing networks. Upon completion of the seizure process, terminal $14a_1$ is at the potential of negative battery, terminal $14a_2$ is at ground potential and terminals $14b_1$ and $14b_2$ are connected together through a telephone set serviced by PBX 12. Under these conditions, the first operative state of switching means 16 and 18 is maintained by the flow of current through the second, third and fourth sensing networks.

Similarly, current flow through one or more of the six sensing networks maintains switching means 16 and 18 in its first operative state prior to, during and upon completion of seizure by PBX 12. Thus, the circuit of the invention does not interfere with line seizure by either the central office or the PBX.

B. RINGING

The circuit of the invention also maintains switching means 16 and 18 in its first operative state during the transmission of ringing current from the central office to the PBX. Assuming, for example, that an office ringing generator which is connected in series with an office negative trip battery is applied between conductor $10a_1$ and office ground and that ground is applied to conductor $10a_2$, switching means 16 and 18 will be maintained in its first operative state during negative excursions of ringing current by current flow through the third sensing network. Switching means 16 and 18 will be maintained in its first operative state during positive excursions of ringing current by current flow through the fifth sensing network. A similar result occurs if an office ringing generator and negative trip battery are connected in series between line conductor $10a_2$ and ground and ground is applied to conductor $10a_1$. Thus, the circuit of the invention does not interfere with the transmission of ringing current between the central office and the PBX.

C. RING TRIP

Related to the ringing condition is the condition of ring trip, that is, a condition in which the answering of an incoming call at the PBX, in response to ringing, results in the disconnection of the ringing generator from the line and the connection thereto of a talking battery. Ring trip occurs when the connection of a d-c current path across the line at the PBX results in the flow of d-c line current and the resultant energization of a trip relay in the central office. Ring trip is still another condition in which switching means 16 and 18 must be in its first operative state.

During ringing and before tripping, switching means 16 and 18 is maintained in its first operative state in the manner described previously in connection with ringing. Upon answer and before tripping, switching means 16 and 18 is maintained in its first operative state not only by each half-cycle of the ringing current through the third and fifth sensing networks but also by the flow of d-c trip current through either the third or fifth sensing network, depending upon whether trip battery is connected to line conductor $10a_1$ or to conductor $10a_2$. After tripping has occurred, through normal exchange operation, negative talking battery is connected to conductor $10a_1$ and ground is connected to conductor $10a_2$. Under the latter condition, switching means 16 and 18 is maintained in its first operative state by current flow through the first, third and fourth sensing networks. Thus, the circuit of the invention causes switching means 16 and 18 to be in its first operative state before, during and after tripping and thereby prevents the circuit of the invention from interfering with the desired tripping activity of the central office and PBX.

D. DIALING

Under the condition of dialing from PBX, the central office connects conductor $10a_1$ to negative battery and connects conductor $10a_2$ to ground. At the same time, the dialing telephone set at the PBX forms a closed loop across line conductors $10b_1$ and $10b_2$. Under these conditions switching means 16 and 18 is maintained in its first operative state by current flow through the first, third and fourth sensing networks. Upon the opening of the dial contacts of the dialing telephone set and resultant opening of the closed loop across conductors $10b_1$ and $10b_2$, switching means 16 and 18 is maintained in its first operative state by the flow of current through the first and fourth current sensing networks. Thus, switching means 16 and 18 is maintained in its first operative state before and during each dial pulse from the PBX. Thus, the circuit of the invention does not interfere with the dialing activity of the PBX.

E. TALKING

After preliminary or signaling conditions such as seizure, ringing and dialing have been completed and the central office and PBX are in their normal talking condition, that is, with ground applied to conductor $10a_1$, negative battery applied to conductor $10a_2$, and a subscriber telephone set connected across conductors $10b_1$ and $10b_2$ through PBX 12, switching means 16 and 18 is maintained in its first operative state by the flow of current in the fourth and fifth sensing networks. Thus, the circuit of the invention does not interfere with normal voice communication through conductor pairs $10a_1$–$10a_2$ and $10b_1$–$10b_2$.

It will be understood that the circuit of the invention is adapted to maintain the first operative state of switching means 16 and 18 under normal exchange functions thereby permitting those functions to continue without interference yet making available the described switching operations to accommodate the special customer service conditions and other exchange operating conditions involving open switching intervals.

F. LOST CALL PREVENTION

Assuming that normal talking conditions exist, switching means 16 and 18 will be held in its first operative state by current flow through the fourth and fifth sensing networks, as previously described. If, under these conditions, the subscriber to which the PBX telephone set is connected should avail himself of a special customer service feature by, for example, depressing and releasing his hookswitch to become connected to a waiting call, central office 11 will, in making the transfer, open circuit conductors $10a_1$ and $10a_2$. Upon the opening of these conductors, current flow through the fourth and fifth sensing networks will be interrupted, thus rendering ineffective the only sensing networks which hold switching means 16 and 18 in its first operative state. As a result, transistor 30 will turn off to cause transistor 29 to energize relay coil 28 and thereby cause switching means 16 and 18 to assume its second operative state to apply virtual battery and ground to PBX 12 and to disconnect and isolate central office 11. The application of voltage to PBX 12 allows the maintenance of the connection of the PBX telephone set to the trunk in spite of the open circuit at the central office. The disconnection of the central office assures that the presence of virtual battery and ground does not afford the operation of the central office equipment. Thus, the circuit of the invention prevents the unintended disconnection of a PBX telephone set from the trunk and also prevents interference with the operation of the central office equipment.

The operation of switching means 16 and 18 in its second operative state will continue until central office 11 reapplies ground potential to conductor $10a_1$ and negative battery to conductor $10a_2$ as, for example, by the second depression and release of the hookswitch by the party utilizing special customer service features. Upon the occurrence of this condition, current will once again begin to flow in the fourth and fifth sensing networks to de-energize relay 28 and thereby restore switching means 16 and 18 to its first operative state. As a result of this restoration, the party at the PBX and the party beyond central office 11 will once again be in voice communication. Thus, the circuit of the invention allows the restoration of voice communication after the utilization of customer service features.

While the circuit of the invention is adapted to hold switching means 16 and 18 in its second operative state as long as is necessary to prevent the disconnection of a completed PBX call from the trunk, such protection may be necessary for only a short interval of time as, for example, during open circuit switching intervals at the central office. One such open circuit switching interval occurs when the central office open circuits conductors $10a_1$ and $10a_2$ for a short time in the course of the polarity reversal which accompanies certain types of answer supervision. Thus, the circuit of the invention provides Open Switching Interval Protection.

Although a finite time is required for contact sets 16 and 18 to assume their dotted line positions after an open circuit appears at central office 11, the circuit of the invention is capable of performing its lost call prevention function sufficiently rapidly to accommodate open switching intervals encountered during the normal operation of telephone exchanges. As a result, the connection of a resistor 58 and a capacitor 59 across the base-emitter circuit of transistor 47 and the connection of a resistor 61 and capacitor 62 across the base-emitter circuit of transistor 53 for the purpose of reducing line noise does not significantly affect the ability of the circuit of the invention to provide the desired open switching interval protection.

In view of the foregoing it will be seen that a circuit constructed in accordance with the invention is adapted to allow the unimpeded transmission of switching, signaling and talking currents between the central office and PBX and is at the same time adapted to prevent the unintended loss of PBX calls as a result of open circuits at the central office.

It will be understood that the above described embodiment is for illustrative purposes only and may be changed or modified without departing from the spirit and scope of the invention as set forth in the appended claims.

What is claimed is:

1. In a circuit for maintaining the connections between a telephone set and a PBX in the presence of an open circuit at the central office side of that PBX, the combination of first and second central office terminals, first and second PBX terminals, switching means having first and second operative states, said switching means being adapted to connect respective office and PBX terminals when said switching means is in a first operative state and to apply a predetermined voltage to said PBX terminals when said switching means is in a second operative state, means for connecting said switching means to said central office terminals, to said PBX terminals and to a source of voltage, means for establishing the second operative state of said switching means when the central office open circuits said first and second office terminals at a time when a telephone set is connected across said PBX terminals, and means for establishing the first operative state of said switching means under other voltage and current conditions at said PBX and central office terminals.

2. In a circuit for maintaining the connections between a telephone set and a PBX in the presence of an open circuit at the central office side of that PBX, the combination of first and second central office terminals, first and second PBX terminals, switching means having first and second operative states, said switching means being adapted to connect respective office and PBX terminals when said switching means is in a first operative state and to apply a predetermined voltage to said PBX terminals when said switching means is in a second operative state, first sensing means for establishing and maintaining said first operative state when the central office applies a first potential to one of said office terminals, second sensing means for maintaining said first operative state when the PBX applies a second potential to one of said PBX terminals, third sensing means for maintaining said first operative state when current flows between the central office and PBX through the other of said office terminals, fourth sensing means for establishing and maintaining said first operative state when the central office applies the second potential to the other of said office terminals, fifth sensing means for maintaining said first operative state when current flows between the central office and the PBX through said one of said office terminals, sixth sensing means for establishing said first operative state when the central office applies the second potential to said one of said office terminals, and means for establishing said second operative state when one of said first through sixth sensing means establishes said first operative state.

3. In a circuit for maintaining the connections between a telephone set and a PBX in the presence of an open circuit at the central office side of that PBX, the combination of first and second central office terminals, first and second PBX terminals, switching means having first and second operative states, said switching means being adapted to connect respective office and PBX terminals when said switching means is in a first operative state and to apply a predetermined voltage to said PBX terminals when said switching means is in a second operative state, means for connecting said switching means to said office terminals, to said PBX terminals and to a source of voltage, means for establishing the first operative state of said switching means during ringing from the central office, means for establishing the first operative state of said switching means during dialing from the PBX, means for establishing the first operative state of said switching means during ring-trip, means for establishing said first operative state before, during and after seizure by the central office or the PBX, means for establishing said first operative state of said switching means during the transmission of voice signals between the central office and PBX, and means for establishing the second operative state of said switching means when a telephone set is connected across said PBX terminals and an open circuit appears at said central office terminals.

4. In a circuit for maintaining the connections between a telephone set and a PBX in the presence of an open circuit at the central office side of that PBX, the combination of first and second central office terminals, first and second PBX terminals, switching means having first and second operative states, said switching means being adapted to directly connect respective office and PBX terminals when said switching means is in a first operative state and to apply a predetermined voltage to said PBX terminals when said switching means is in a second operative state, means for connecting said switching means to said central office terminals, to said PBX terminals, and to a source of voltage, control means having a control input, said control means serving as means for establishing the first operative state of said switching means when the voltage at said control input exceeds a predetermined value and for establishing a second operative state of said switching means when the voltage at said control input is less than said predetermined value, "OR" circuit means for applying to said control input a voltage in excess of said predetermined value when said second office terminal is connected to ground or when said second office terminal is connected to the central office battery, or when said first office terminal is connected to central office battery or when current flows through said first or second office terminal, or when said second PBX terminal is at a potential having the same polarity as the potential of the central office battery, said "OR" circuit means being arranged to apply to said control input a voltage less than said predetermined value when none of said terminal voltage and current conditions exist.

5. In a circuit for maintaining the connections between a telephone set and a PBX in the presence of an open circuit at the central office side of that PBX, the combination of first and second office terminals, first and second PBX terminals, switching means having first and second operative states, said switching means being adapted to directly connect respective office and PBX terminals when said switching means is in a first operative state and to apply a predetermined voltage to said PBX terminals when

6. In a circuit for maintaining the connections between a telephone set and a PBX in the presence of an open circuit at the central office side of that PBX, the combination of first and second central office terminals, first and second PBX terminals, switching means having first and second operative states, said switching means being adapted to connect respective office and PBX terminals when said switching means is in a first operative state, said switching means being adapted to apply a predetermined voltage to said PBX terminals and to disconnect said central office terminals when said switching means is in a second operative state, means for connecting said switching means to said central office terminals, to said PBX terminals and to a source of voltage, means for establishing the second operative state of said switching means each time that the central office open circuits said first and second office terminals at a time when a telephone set is connected across said PBX terminals, and means for establishing the first operative state of said switching means under other voltage and current conditions at said PBX and central office terminals.

7. In a circuit for maintaining the connections between a telephone set and a PBX in the presence of an open circuit at the central office side of that PBX, the combination of first and second central office terminals, first and second PBX terminals, switching means having first and second operative states, said switching means being adapted to connect respective office and PBX terminals when said switching means is in a first operative state, said switching means being adapted to apply a predetermined voltage to said PBX terminals and to disconnect said central office terminals when said switching means is in a second operative state, means for connecting said switching means to said office terminals, to said PBX terminals and to a source of voltage, means for establishing the first operative state of said switching means during ringing from the central office, means for establishing the first operative state of said switching means during dialing from the PBX, means for establishing the first operative state of said switching means during ring-trip, means for establishing said first operative state during seizure by the central office or the PBX, means for establishing said first operative state of said switching means during the transmission of voice signals between the central office and PBX, and means for establishing the second operative state of said switching means when a telephone set is connected across said PBX terminals and an open circuit appears at said central office terminals.

8. In a circuit for maintaining the connections between a telephone set and a PBX in the presence of an open circuit at the central office side of that PBX, the combination of first and second central office terminals, first and second PBX terminals, switching means having first and second operative states, said switching means being adapted to connect respective office and PBX terminals when said switching means is in a first operative state and to apply a predetermined voltage to said PBX terminals when said switching means is in a second operative state, means for operatively connecting said switching means to said office terminals, to said PBX terminals and to a source of voltage, means responsive to ringing voltage or current for establishing the first operative state of said switching means during ringing, means operatively connecting said ringing responsive means in said circuit to sense the presence of the ringing condition, means operatively connecting said ringing responsive means to said switching means to control the operative state thereof, means responsive to dialing voltage or current for establishing the first operative state of said switching means during dialing, means operatively connecting said dialing responsive means in said circuit to sense the presence of the dialing condition, means operatively connecting said dialing responsive means to said switching means to control the operative state thereof, means responsive to trip current for establishing the first operative state of said switching means during ring-trip, means operatively connecting said ring-trip responsive means in said circuit to sense the presence of the ring-trip condition, means operatively connecting said ring-trip responsive means to said switching means to control the operative state thereof, means responsive to seizure voltages or currents for establishing said first operative state during seizure, means operatively connecting said seizure responsive means in said circuit to sense the presence of the seizure condition, means operatively connecting said seizure responsive means to said switching means to control the operative state thereof, means responsive to d-c talking voltage or current for establishing said first operative state of said switching means during the transmission of voice signals between the central office and PBX, means operatively connecting said talking responsive means in said circuit to sense the presence of the talking condition, means operatively connecting said talking responsive means to said switching means to control the operative state thereof, and means for establishing the second operative state of said switching means when a telephone set is connected across said PBX terminals and an open circuit appears at said central office terminals.

9. In a circuit for maintaining the connections between a telephone set and a PBX in the presence of an open circuit at the central office side of that PBX, the combination of first and second central office terminals, first and second PBX terminals, a control relay having a coil and first and second contact sets, means for connecting said first contact set to said first office terminal, to said first PBX terminal and to a source of voltage, means for connecting said second contact set to said second office terminal, to said second PBX terminal and to said source of voltage, said first and second contact sets serving to connect said first office and PBX terminals and said second office and PBX terminals, respectively, when said coil is in a first state of energization, said first and second contact sets serving to connect said first and second PBX terminals to said source of voltage when said coil is in a second state of energization, a first transistor having a power circuit and a control circuit, said first transistor serving as means for controlling the state of energization of said coil, a second transistor having a power circuit and a control circuit, said second transistor serving as means for controlling the state of energization of said coil, means for connecting the control circuit of said first transistor to said first office terminal and to ground, means for connecting the control circuit of said second transistor to said second office terminal and to ground, means for connecting the power circuits of said first and second transistors in state controlling relationship to said coil, first and second unidirectional conducting means for bypassing current around the control circuits of said first and second transistors, respectively, third unidirectional conducting means for connecting said second office terminal in state controlling relationship to said coil, and means for connecting said second PBX terminal in state controlling relationship to said coil.

10. In a circuit for maintaining the connections between a telephone set and a PBX in the presence of an open circuit at the central office side of that PBX, the combination of first and second central office terminals, first and second PBX terminals, first and second contact sets each including a movable contact, a first fixed contact and a second fixed contact, means for connecting the first fixed contacts of said first and second contact sets to said first and second central office terminals, respectively, means for connecting the movable contacts of said first and second contact sets to the first and second PBX terminals, respectively, means for connecting the second fixed contacts of said first and second contact sets to a source of voltage, a coil for closing said movable contact against said first fixed contact when said coil is de-energized and for closing said movable contact against said second fixed contact when said coil is energized, controllable switching means having a control input, said controllable switching means serving as means for maintaining said coil in a de-energized state when the control voltage and current at said control input exceed predetermined minimum values and for energizing said coil when the voltage and current at said control input are less than said predetermined values, first and second transistors each having a power circuit and a control circuit, means for connecting the control circuit of said first transistor to said first office terminal and to ground, means for connecting the control circuit of said second transistor to said second office terminal and to ground, first and second unidirectional conducting means for by-passing current flow around said first and second control circuits, a third transistor having a power circuit and a control circuit, means for connecting the power circuit of said third transistor between ground and said control input, means for connecting the control circuit of said third transistor between ground and the power circuits of said first and second transistors, means for connecting the control circuit of said third transistor between ground and said second PBX terminal and means for connecting said second office terminal and said control input. said switching means is in a second operative state, sensing means for maintaining the first operative state of said switching means when current flows between the central office and PBX, sensing means for establishing and maintaining the first operative state of said switching means when central office battery potential is applied to either central office terminal, sensing means for establishing and maintaining the first operative state of said switching means when ground potential is applied to one of said central office terminals, sensing means for maintaining the first operative state of said switching means when a potential having the same polarity as the central office battery potential is applied to one of said PBX terminals, and means for establishing the second operative state of said switching means when none of said sensing means are in condition to establish or maintain the first operative state thereof.

* * * * *

UNITED STATES PATENT OFFICE
CERTIFICATE OF CORRECTION

Patent No. 3,854,012 Dated December 10, 1974

Inventor(s) Charles W. Chambers, Jr.

It is certified that error appears in the above-identified patent and that said Letters Patent are hereby corrected as shown below:

In the claims, Claim 2, line 29, change "one" to --none--.

Claim 5, line 10, after "when" insert --said switching means is in a second operative state, sensing means for maintaining the first operative state of said switching means when current flows between the central office and PBX, sensing means for establishing and maintaining the first operative state of said switching means when central office battery potential is applied to either central office terminal, sensing means for establishing and maintaining the first operative state of said switching means when ground potential is applied to one of said central office terminals, sensing means for maintaining the first operative state of said switching means when a potential having the same polarity as the central office battery potential is applied to one of said PBX terminals, and means for establishing the second operative state of said switching means when none of said sensing means are in condition to establish or maintain the first operative state thereof.---.

Claim 10, line 42, delete the language following "input."

Signed and sealed this 18th day of February 1975.

(SEAL)
Attest:

RUTH C. MASON
Attesting Officer

C. MARSHALL DANN
Commissioner of Patents and Trademarks